COLOR PHASE LOCK SYSTEM FOR REMOTELY LOCATED TELEVISION CAMERA

Filed Aug. 17, 1967 9 Sheets-Sheet 1

INVENTOR

BUCK C. BROWN

BY Arnold, Roylance, Kruger & Durkee

ATTORNEYS

INVENTOR
BUCK C. BROWN
BY
Arnold, Roylance, Kruger & Durkee
ATTORNEYS

Feb. 3, 1970 B. C. BROWN 3,493,680

COLOR PHASE LOCK SYSTEM FOR REMOTELY LOCATED TELEVISION CAMERA

Filed Aug. 17, 1967 9 Sheets-Sheet 3

INVENTOR

BUCK C. BROWN

BY

Arnold, Roylance, Kruger & Durkee
ATTORNEYS

INVENTOR
BUCK C. BROWN

BY *Arnold, Roylance, Kruger & Durkee*
ATTORNEYS

INVENTOR

BUCK C. BROWN

BY *Arnold, Roylance, Kruger & Durkee*

ATTORNEYS

INVENTOR
BUCK C. BROWN

BY
Arnold, Roylance, Kruger & Durkee
ATTORNEYS

INVENTOR
BUCK C. BROWN
BY
Arnold, Roylance, Kruger & Durkee
ATTORNEYS

Feb. 3, 1970 B. C. BROWN 3,493,680

COLOR PHASE LOCK SYSTEM FOR REMOTELY LOCATED TELEVISION CAMERA

Filed Aug. 17, 1967 9 Sheets-Sheet 8

INVENTOR
BUCK C. BROWN

BY

Arnold, Roylance, Kruger & Durkee
ATTORNEYS

Feb. 3, 1970 B. C. BROWN 3,493,680

COLOR PHASE LOCK SYSTEM FOR REMOTELY LOCATED TELEVISION CAMERA

Filed Aug. 17, 1967 9 Sheets-Sheet 9

INVENTOR

BUCK C. BROWN

BY Arnold, Roylance, Kruger & Durkee

ATTORNEYS 3,493,680
Patented Feb. 3, 1970

3,493,680

COLOR PHASE LOCK SYSTEM FOR REMOTELY LOCATED TELEVISION CAMERA

Buck C. Brown, Rockville, Md., assignor to Tracor, Inc., Austin, Tex., a corporation of Texas Filed Aug. 17, 1967, Ser. No. 661,391
Int. Cl. H041 7/04
U.S. Cl. 178—69.5 4 Claims

ABSTRACT OF THE DISCLOSURE

A system for phase locking the color synchronization subcarrier signal of one or more remotely located color television program sources with the color synchronization subcarrier of a central or master program source in which each remote program signal is received, and the color burst, which is representative of the subcarrier signal, is separated from the video signal and phase compared with the color subcarrier generated at the master source location. Signals are generated, at audio frequency, representative of the direction and magnitude of the phase error. The audio signals are transmitted over low quality transmission lines (e.g., telephone lines) to the remote source location where they are interpreted and used to shift the phase of the remotely generated color subcarrier.

This invention relates to television synchronization apparatus and especially to apparatus for synchronizing the television signals from two or more sources of color video information.

In the programming of color or black-and-white television programs it is frequently desirable to cover two events concurrently and to provide the viewing audience with pictures of both events simultaneously. This is especially true when live transmission (as opposed to recorded and delayed transmission) is important as, for example, with two simultaneously occurring sports events, or two news events both of which require continuing coverage to some degree.

Concurrent video coverage is accomplished by receiving the video and audio information from two sources and then using parts of some of the picture producing lines for one scene and the remainder of the lines for a different scene. The result on the viewer's receiver is a picture of one event occupying, for example, the bottom half and one upper quarter of the television picture tube, with a picture of the other event occupying the remaining quarter of the screen. Alternatively, one picture can occupy the left half of the screen with the other on the right half. The techniques for accomplishing this "split picture" effect are well known and need not be described herein.

So long as the sources for the video information are from the same studio, or only involve a transmitting station and one remote location, no particular problems arise. However, it has been found that when color video information originates at two remote locations and must be relayed from those to the central studio site for combining and transmitting to the general viewing audience, the picture splitting is not possible by known techniques because the synchronizing signals from the remote locations are no longer continuously in phase with each other or with the central studio-transmitter.

It would be possible by known techniques to receive the video signal from the remote station, separate out the necessary synchronization signals and adjust the phase of the central, or home, location to that of the remote. However, if a second remote is simultaneously used, this approach fails because it is obviously not possible to synchronize the local generators to both remotes at once unless the remotes should, by coincidence, be synchronized with each other.

It is therefore an object of the present invention to provide apparatus for phase-locking one or more remote television program sources to a central television station.

Another object is to provide means for phase-locking two or more remote color television sources to a central television station.

Another object is to provide means for phase-locking two or more remote color television sources to a central location so that the programs from those sources can be mixed, faded, superimposed or otherwise combined with each other or with a program having its source at the central location without deleterious effects.

A further object is to provide apparatus for phase locking a plurality of color television program sources using relatively low quantity transmission lines such as conventional telephone lines.

The invention is based on the need for accurate phase synchronization of the 3.58 megahertz color bursts which are generated at each program source as well as at the central station. The sources used for this signal (more accurately at a frequency of 3.579545 mHz.) are high quality, stable oscillators of sufficient precision and stability to be categorized as frequency standards, but they are not interconnected directly with each other because of the distances normally involved.

In accordance with method embodiments of the invention, video signals are produced at at least two different program sources or locations, each signal including the 3.58 mHz. color bursts. The color bursts are detected from each of the signals, an error signal is generated having a characteristic representative of the phase displacement between the color bursts, and the phase of the color burst signal produced at one location is shifted in response to the error signal to bring the color burst of that video signal into phase coincidence with the color burst of the video signal produced at the other location. Advantageously, detection of the color bursts from both signals and generation of the phase error signal are accomplished at the loaction of the central program source, the error signal is converted into an audio signal, and the latter is transmitted to the remote program location via a low quality transmission line, e.g., a telephone line, the audio signal being reconverted to a meaningful error signal at the remote program location.

Apparatus embodiments of the invention perform the synchronizing operation by accepting the color subcarrier information from the master or local program source, accepting the received video signals transmitted from the remote video program source, isolating from the remote source the color burst, and comparing the phase of the color bursts from the remote video source with that of the color subcarrier for the master source. If a phase difference exists between these signals, a correction signal is then generated, the correction signal having a characteristic representative of the phase error between the two color components. The significant characteristic of the correction signal is then reduced to audio signals which are of such a nature as to be suitable for transmission over a conventional low quality transmission line such as a conversation quality telephone line. The signals transmitted over the transmission line are of such a nature that the degenerative effect of the distance between the master and remote program sources does not significantly diminish the effectiveness of the signal. The signals are received at the remote location and an analysis process is followed which is similar to the synthesis process at the master location. A phase correction signal is generated and is connected to a 3.58 mHz. phase shifting apparatus at the remote video program source, the correction signal being effective to shift the phase of the remote source color burst in a desired direction to synchronize with the equivalent color subcarrier generated by the master video equipment.

In order that the manner in which the foregoing and other objects are accomplished in accordance with the invention can be understood in detail, one particularly advantageous embodiment thereof will be described with reference to the acompanying drawings, which form a part of this specification, and wherein.

Figure 1:
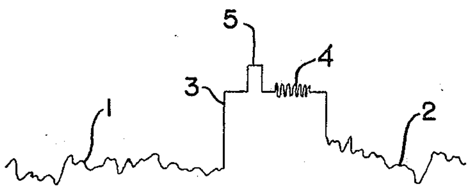
FIG. 1 is a waveform diagram of a portion of a typical color television signal which includes the information processed by the apparatus of the present invention.

FIG. 1 shows a portion of a video signal of the type which exists in a color television transmission from either a central transmitting station or from a remote video program source to a central station. The signal includes video information portions indicated at 1 and 2 which provides luminance and color information to produce a television picture. The signal also includes a substantially rectangular horizontal blanking pulse 3 upon which is superimposed the horizontal synchronizing pulse 5. The blanking pulse includes a trailing portion, referred to as the "back porch," which is modulated by a color burst or color synchronizing signal 4 consisting of approximately eight cycles of the 3.579545 mHz. subcarrier signal, ususally simplified to 3.58 mHz. for discussion. Color burst 4 in the remote video source must be locked in phase with the similar burst produced in the central program source for the signals from the two sources, geographically separated, to be mixed, faded, superimposed, or otherwise combined.

Figure 2:
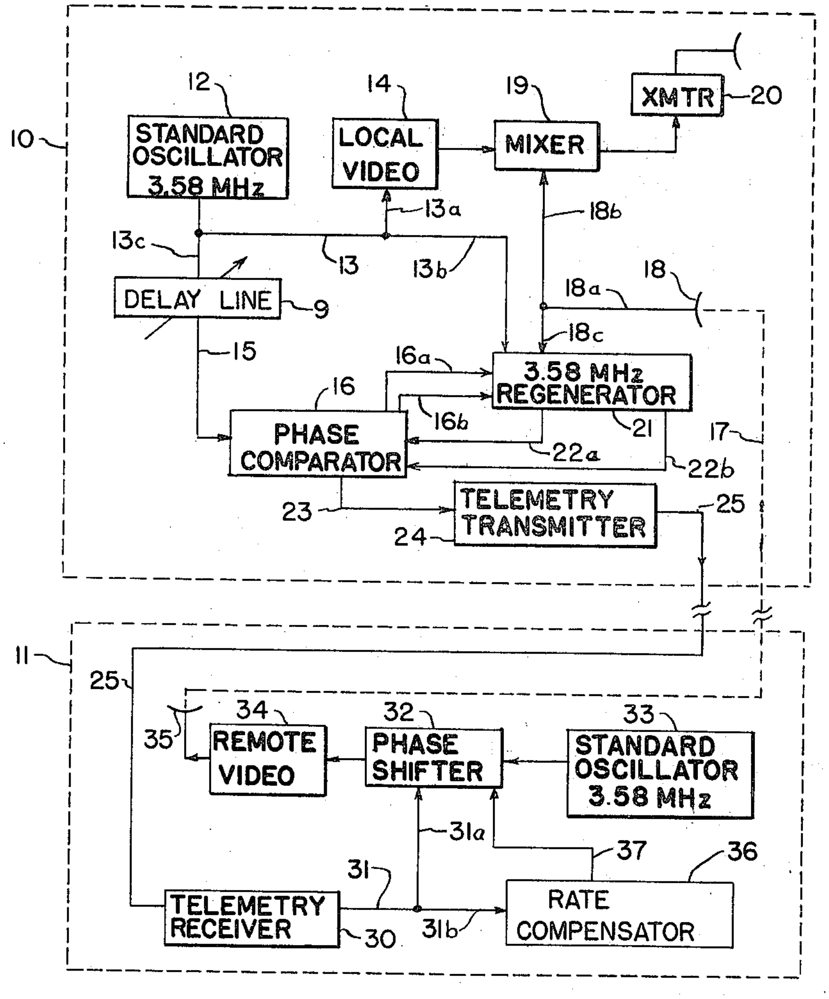
FIG. 2 is a schematic system diagram of an apparatus in accordance with the invention.

An apparatus for performing this synchronization is shown in FIG. 2 in which the apparatus in block 10 comprises that which is located at the central program source, and the apparatus within block 11 comprises the apparatus at one remote video source. It will be understood that more than one remote video source can be used in this system and that this system is particularly capable of synchronizing plural remote sources with the central source where other systems have been unable to do so.

The apparatus at the central source location includes a conventional standard oscillator 12 which produces a 3.58 mHz. signal which is delivered by a conductor 13 and 13*a* to the local video program generating apparatus 14. The 3.58 mHz. signal is also applied via conductors 13 and 13*b* to an input of a 3.58 mHz. regenerator unit 21. The local video program apparatus is standard equipment and is shown herein only for completeness, this apparatus comprising no part of the present invention. The 3.58 mHz. signal from unit 12 is also delivered to one input of a phase comparator unit 16 via conductor 13*c*, adjustable delay line means 9, and conductor 15. Adjustable delay line 9 provides a manually controlled variable phase shift circuit to delay the 3.58 mHz. master signal applied to phase comparator 16.

Program signals generated by the remote source are transmitted to the central source by microwave transmission, coaxial cable, or other convenient means, the appropriate medium being indicated by the dotted lines 17. These program signals are received as by an antenna 18, coaxial cables, or other convenient means, and delivered, via cables 18*a* and 18*b*, to a mixer unit 19 which is also conventional apparatus and which is capable of combining the signals from the local source and the remote source, or from two or more remote sources, to provide the desired composite television signal. This composite signal is then delivered to transmitting equipment for transmitting a multiple video output signal in combination with an antenna, this being identified in FIG. 2 by numeral 20. This again is conventional equipment and will not be described in greater detail.

The incoming program signal from the remote source is also connected, via cables 18*a* and 18*c*, to an input terminal of a 3.58 mHz. regenerator unit 21 which will be described in greater detail, and which is capable of extracting the 3.58 mHz. signal identified as 4 in FIG. 1 from the remaining information in the video signal, and also capable of regenerating a continuous 3.58 mhz. subcarrier signal. The 3.58 mHz. subcarrier is then delivered by a conductor 22*a* to the other input terminal of phase comparator 16. A color guard pulse is transmitted by conductor 22*b* to phase comparator 16 in the event that no 3.58 mHz. burst is detected, i.e., in the event of color failure of the remote program source, to gate off phase compartor 16. Phase comparator 16 then detects any difference in phase between the 3.58 mHz. reference signal from oscillator 12 and the regenerated signal from unit 21 and develops a phase error signal which is delivered by a conductor 23 to a telemetry transmitter unit 24. Transmitter 14 converts the phase error signal into a form which can be transmitted over relatively low quality transmission lines and connected to those lines for delivery to unit 11. The transmission lines can conveniently be conventional relatively low quality telephone lines generally known in the telephone communication industry as conversation quality lines. The bandwidth of the transmission lines is approximately 2000 Hz. No microwave or coxial transmission need be involved in transmitting this information. The telephone or other transmission lines are identified in FIG. 2 as 25. Phase comparator 16 also generates a series of timed correction pulses which are applied to 3.58 mHz. regenerator 21 through conductors 16*a* and 16*b*. The series of timed correction pulses cause 3.58 mHz. regenerator 21 to inhibit the remote 3.58 mHz. pulse burst applied over conductor 22 while regenerator 21 makes minor phase corrections due to internal temperature variations and drift. This internal phase correction interplay between phase comparator 16 and 3.58 mHz. regenerator 21 will be discussed in greater detail below.

The phase error signals on lines 25 are delivered into unit 11 at the remote source location and to the input terminal of a telemetry receiver unit 30 which reconverts the form of the phase error signal and provides an advance or retard signal on conductors 31 and 31*a* to a variable phase shifter circuit 32. A command signal is also applied via conductors 31 and 31*b* to a rate compensator unit 36. Circuit 32 is connected between the remote source standard 3.58 mHz. oscillator 33 and the conventional remote video source apparatus 34 which produces the program signals to be transmitted by a transmitter 35 to the central source location. Rate compensator 36 averages the total number of advance or retard signals and applies, via conductor 37, a rate pulse to govern the rate of the phase shift by unit 32. It will be apparent that the function of phase shifter 32 is to adjust the phase of the output of oscillator 33 to coincide with that of oscillator 12.

Figure 3:
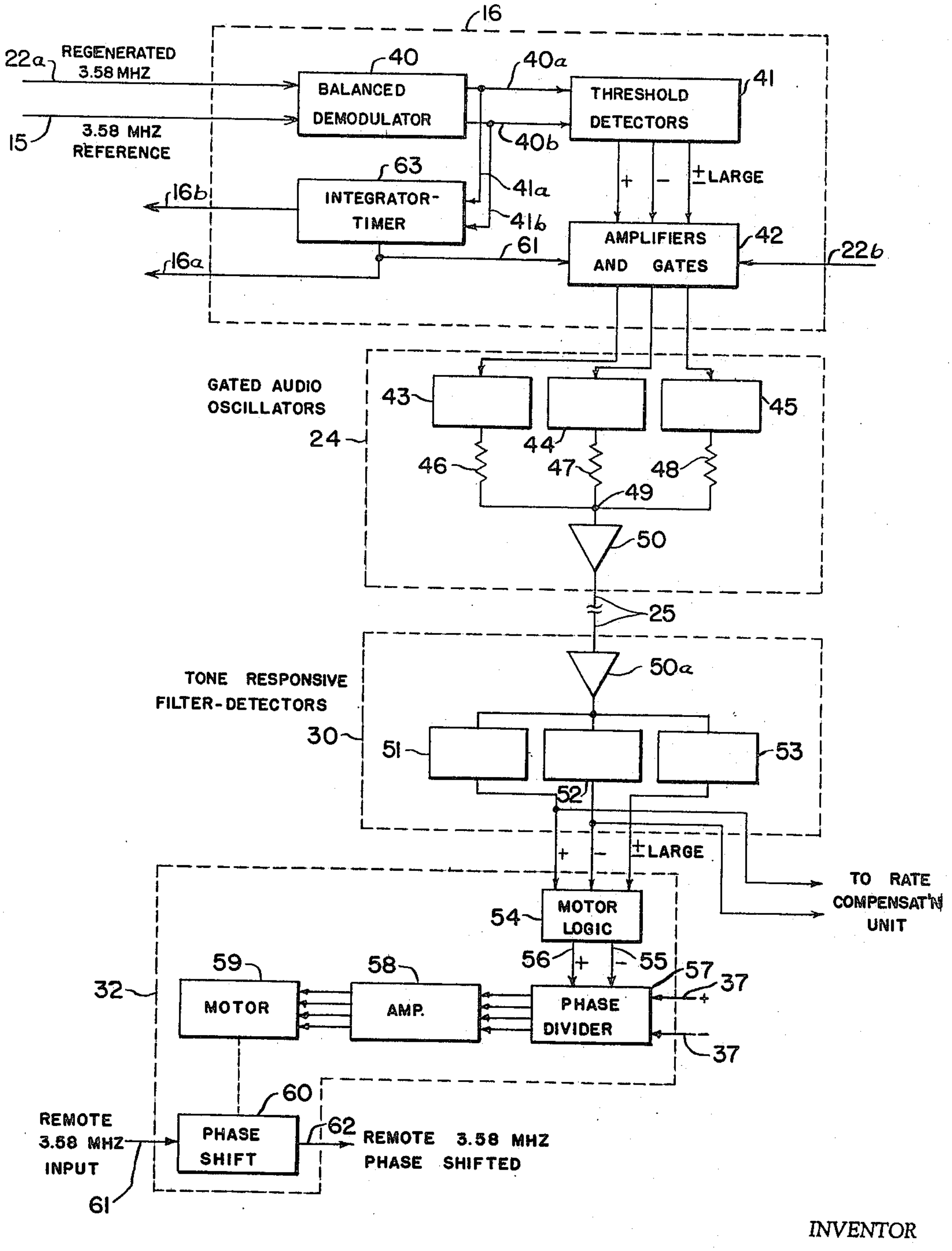
FIG. 3 is a schematic diagram showing, in greater detail, phase comparator and telemetry apparatus usable in the system of FIG. 2.

FIG. 3 shows in greater detail the operative components of phase comparator 16, telemetry transmitter 24, telemetry receiver 30, and phase shifter 32. The regenerated 3.58 mHz. signal on conductor **22*a* and the reference 3.58 mHz. signal on conductor 15 are delivered to the input terminals of a conventional balanced demodulator circuit 40 which is used as a phase detecting circuit to generate signals proportional to the phase difference between the input 3.58 mHz. signals. The phase difference signals are of opposite polarity to indicate the direction of phase difference of the regenerated signal as compared to the reference. It will be recognized that three possible conditions are significant in the phase relationships between these two signals, one being the recognition of a relatively small phase difference in a lead direction, the second being a relatively small phase difference in the lag direction, and the third being a very large phase error in either direction. The DC signal produced by the balanced demodulator can exist at any level within the preselected design range, the level of this DC and its polarity necessarily lying within one of these three sets of circumstances. The phase error output signals of demodulator 40 are then applied via conductors 40*a* and 40*b* to the input of a threshold detector circuit 41 which uses Zener diode circuits to sense small signals in either of the two polarities or large signals in either polarity. Detector circuit 41 produces three outputs, representative of the three possible conditions. Each output is connected to one of three inputs to an amplifier and gate unit 42. Threshold detector 41 also applies a sample of the phase error signals, received from demodulator 40, to an input of an integrator-timer circuit 60. Amplifier and gate unit 42 includes three separate channels, each of which is capable of amplifying one of the input signals from detectors 41 and triggering a conventional gate circuit. Integrator timer 60 contains a free-running multivibrator circuit that operates at a relatively slow rate, producing a gating output signal connected to the gate circuit portions of unit 42 as infrequently as once every thirty seconds. Coincident in time with the operation of the multivibrator circuit to produce gating output signals, integrator timer 60 also generates a balance sample pulse which is applied to 3.58 mHz. regenerator 21 via conductor 16*a*, as shown in FIG. 2. The gating signal to unit 42 disables the gates and inhibits the passage of the detected error signals from threshold detectors 41. The sample pulse inhibits the remote 3.58 mHz. color burst in regenerator unit 21 but allows the 3.58 mHz. master signal to be passed via conductor 22*a*, FIG. 2, to one input of demodulator 40 as previously described. The 3.58 mHz. signal from the regenerator unit 21 is compared with the 3.58 mHz. master signal to generate an error output to the threshold detectors 41 as earlier described. The phase error between these two signals is a measure of the signal phase drift caused by the regenerator unit 21 itself. Since the balance sample pulse via conductor 61 has gated off the amplifier and gate unit 42, the error signals from detectors 41 are not passed to the remainder of the system. However, a sample of the error signal is applied through conductors 41*a* and 41*b* to integrator-timer 63, which measures the error signal and produces a correction signal applied through conductor 16*b* to regenerator unit 21 which in turn causes that unit to correct for the phase drift inherent in its own components. As soon as the correction has taken place, the multivibrator within integrator-timer 63 changes state and the balance sample pulse is removed, enabling the gates within amplifier and gate unit 42 and allowing the remote 3.58 mHz. signal to once again be processed by regenerator unit 21. Integrator-timer 63 also integrates the error signal applied via conductors 41*a* and 41*b* from detector unit 41 during the sample balance period. This integrated level is remembered by the integrator-timer 63 until the next sample balance interval when it is used as a reference for generating the next correction signal to be applied to regenerator unit 21. The outputs from the three gate circuits of unit 42 are connected in unit 24 to one of three gated audio oscillators 43, 44 or 45. Each gated audio oscillator circuit can be any conventional form of oscillator capable of generating an electrical signal in the audio frequency range, each circuit being biased into a nonoscillatory condition unless an input signal is provided. Alternatively the audio oscillator circuits can include oscillators which continuously produce audio signals, but which include gate circuits which are biased into an off or nonconductive condition in the absence of a gate signal. Providing the appropriate gate signal allows the audio oscillations to be provided to the output terminal of the particular oscillator circuit. A significant feature of the audio oscillator trio is that each oscillator is tuned to a different audio frequency, preferably frequencies which are not harmonics of each other. As an example, oscillator 43 can be tuned to a frequency of 560 Hz., oscillator 44 can be tuned to a frequency of 730 Hz., and oscillator 45** can be tuned to a frequency of 960 Hz. These are non-interfering frequencies which can be combined, transmitted on a single transmission line pair, and later identified without serious difficulty.

The outputs of the oscillators are coupled through summing resistors 46, 47, and 48 to a summing junction 49 at the input of a conventional amplifier 50. The three tones are thus combined and amplified and coupled by the amplifier to suitable connection equipment at the termination of a conventional telephone line 25.

It will be recognized that by separating the three possible phase difference conditions and converting them to the form of three separate audio frequency tones, the signals can be transmitted over the telephone lines without the need for close control of the signal amplitudes and without significant concern about the phase relationships of the tone signals, or, within a reasonable range, without concern for their frequencies. The audio tones in their combined form are received at telemetry receiver unit 30 and coupled, still in the combined form, to an amplifier **50*a*, the output of which is applied to three tone responsive filter detector circuits 51, 52, and 53. The filter detector circuits are conventional tuned filters, each one being responsive to one of the three tones generated by oscillators 43, 44, and 45. Each filter is capable of passing a narrow band containing the frequency to which it is designed to respond, this audio signal then being detected to produce a DC signal level indicative of the lead or lag phase difference detected in threshold detector unit 41 and which is connected to a motor logic circuit 54 in phase shift unit 32**.

Motor logic circuit 54 converts the DC levels which include the lead, lag, or very large error information into repetitive pulses at selectable repetition rates. The outputs of logic circuit 54 are two pulse trains which are coupled by conductors 55 and 56 to two inputs of a phase divider circuit 57. If the error is large in either a lead or a lag direction, the repetition rate of the appropriate pulse train is simnificantly increased, thereby delivering to unit 57 the information that a large error exists and in which direction. Phase divider 57 then generates a sequence of four pulse sets which are representative of the number of pulses supplied by unit 54 and also of the number of rate compensator pulses coupled to unit 57 from unit 36 via conductors **37*a* and 37*b***.

The pulses generated by divider 57 are supplied to a motor drive amplifier unit 58 which includes four switching amplifiers each of which amplifies and passes its associated phase pulse from divider 57. The four phase outputs in the sequence are then applied to the inputs of drive motor 59. The sequence in which the four phase pulses are applied to the motor determine the direction and rate at which the motor operates.

The motor is mechanically coupled to a variable phase shift unit 60, which is effective to alter the phase of an input signal provided on conductor 61, which is the 3.58 mHz. signal from oscillator 33, and provide the phase shifted signal on an output conductor 62 which is connected to the input of remote video source unit 34. The variable phase shift unit is a rotating capacitor resolver, with an input circuit capable of supplying quadrature 3.58 mHz. components from the remote 3.58 mHz. signal source to the resolver.

Although it is believed that the operation of this apparatus would be clear from the above description, an example can be considered in which a signal is received by central source 10 from remote source 11 and is to be mixed with a locally generated video program in mixer circuit 19 for ultimate transmission. Regenerator circuit 21 extracts the color burst signal from the received remote source program signal and delivers a regenerated subcarrier on conductor **22*a* to comparator 16. Assuming that the signal on conductor 22*a* is not in phase with the signal on conductor 15 from adjustable delay line 9, demodulator circuit 40 provides a DC signal to threshold detectors 41 which provides a signal on one of its three outputs to one portion of amplifier and gate unit 42, which portion then provides a signal to gate one of audio oscillators 43, 44, or 45. The audio signal thus produced is coupled to amplifier 50, carried on telephone lines 25, applied to amplifier 50*a*, and received at the three tone responsive filter detector circuits 51, 52, and 53. The one of the three tone responsive circuits which is responsive to the particular frequency generated by the audio oscillator provides a series of phase command signals to the motor 59 through the allied circuitry of phase shifter 32, thus driving the phase shift circuit 60 to correct the phase of the color burst signal in the remote program source unit. Thereafter, if the correction made is not adequate, the cycle is repeated until the color burst signals contained in the video information provided to mixer 19** are in phase.

Figure 4:
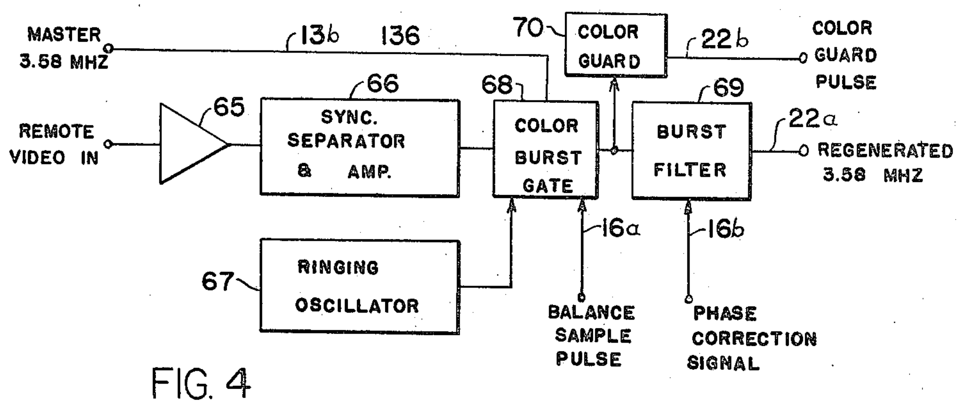
FIG. 4 is a schematic diagram of a 3.58 mHz. regenerator usable in the system of FIG. 2.

FIG. 4 shows in greater detail the elements of regenerator unit 21 which accepts the remote video information at the input terminal of an amplifier 65 which amplifies the video signal and provides it to a conventional sync separator and amplifier circuit 66. The amplifier and sync separator receives the composite video information and provides amplification, DC restoration and video filtering. A sync pulse output, constituting a portion of the waveform shown in FIG. 1, is provided to a ringing oscillator circuit 67 the output of which is a gate signal which is connected to a color burst gate circuit 68. The video information is also provided from the sync separator to the color burst gate so that only the portion of the video signal including the burst signal is allowed to pass. The master 3.58 mHz. color subcarrier signal from oscillator 12 is also applied to color burst gate 68 via conductor **13*b*. This master 3.58 mHz. color subcarrier is gated off until the balance sample pulse via conductor 16*a* arrives from integrator-timer 63. The output of gate 68 is connected to a burst filter circuit 69 which is a conventional crystal filter tuned to the 3.58 mHz. signal and which operates as a bandpass filter, narrowly tuned, to allow only the 3.58 mHz. signal to pass. The output of this circuit constitutes the regenerated 3.58 mHz. signal which is then delivered to the balanced modulator in phase comparator circuit 16. The phase compensation signal from integrator timer 63 is also applied to burst filter 69 to make necessary phase corrections within the burst filter circuit due to temperature variations and drift. The output from color burst gate 68 is also applied to color guard unit 70, which senses the absence of the color burst signal passing through gate 68, and produces a color guard pulse connected to amplifier and gate unit 42 through conductor 22*b*** to block the gate and inhibit the passage of phase shift signals.

Figure 5:
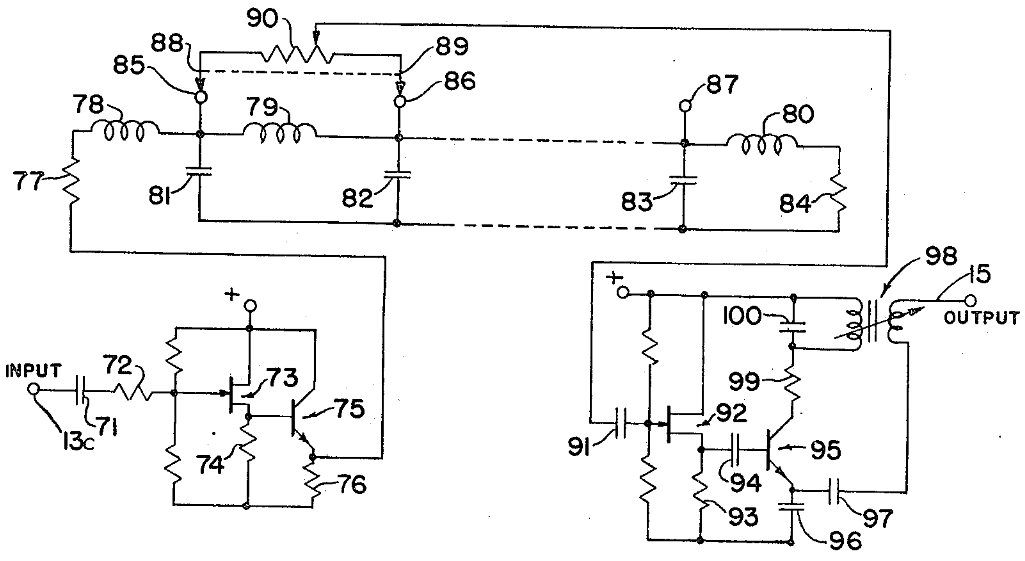
FIG. 5 is a schematic diagram of an adjustable delay line means usable in the system of FIG. 2.

FIG. 5 shows in detail the adjustable delay line means 9, which serves to compensate for time delays existing as a result of the lengths of conductors 13, **13*b*, 13*c*, 15, 18*a*, 18*b*, and 18*c*. The input from the standard oscillator 12 is connected via conductor 13*c* through a capacitor 71 and an input resistor 72 to the control electrode of a field effect transistor indicated generally at 73. The field effect transistor (FET) is connected as a source follower circuit, the output being developed across a fixed resistor 74 and connected to the base electrode of a conventional NPN transistor indicated generally at 75. Transistor 75 is connected as an emitter follower circuit, the output being developed across an emitter resistor 76 and coupled through a series resistor 77 to a switchable delay line including a plurality of inductor elements 78, 79, 80 and a plurality of parallel connected capacitors 81, 82, and 83, the inductors and capacitors being connected in a well known manner as a conventional delay line. A fixed resistor 84 is connected across the opposite end of the delay line to constitute a matching terminating impedance. Each junction of a capacitor and the associated inductors is connected to one of a plurality of fixed switch contacts 85, 86, and 87. A pair of movable contacts 88 and 89 are mechanically coupled together to make electrical contact simultaneously with two adjacent ones of the fixed contacts, the two movable contacts being connected together by the resistance element of a potentiometer 90. The movable wiper of the potentiometer receives the delayed signal inserted at the end of the delay line, the delay having been broadly selected in major steps by the positions of the movable contacts. The delayed signal is coupled through a fixed capacitor 91 to the control electrode of a field effect transistor indicated generally at 92. FET 92 is also connected as a source follower to present a high impedance, the output being taken from a fixed resistor 93 and coupled through a capacitor 94 to the base electrode of a conventional NPN transistor indicated generally at 95. Transistor 95 is connected as a tuned amplifier circuit, the circuit including a series collector resistor 99 and a tuned load circuit comprising a capacitor 100 connected in parallel circuit relationship with the primary winding of a tunable transformer indicated generally at 98. One terminal of the secondary winding of transformer 98 is connected to an input of phase comparator circuit 16 via conductor 15. The other terminal of the secondary winding is connected through a feedback capactor 97 to the junction of the emitter electrode of transistor 95 and a capacitor 96**, the other terminal of which is grounded.

As will be seen, the switching apparatus of the delay line provides major steps of delay which are manually selectable by moving the movable contacts 88 and 89 from one pair of terminals to the next. A fine delay is provided by the manual adjustment of potentiometer 90. If the delay line includes ten delay stages, the apparatus will be seen to provide discrete delay steps (for example, of 36° each), the fine adjustment between the intermediate steps being accomplished by the adjustment of potentiometer 90. The mechanical apparatus for performing this function is well known in the art.

Figure 6:
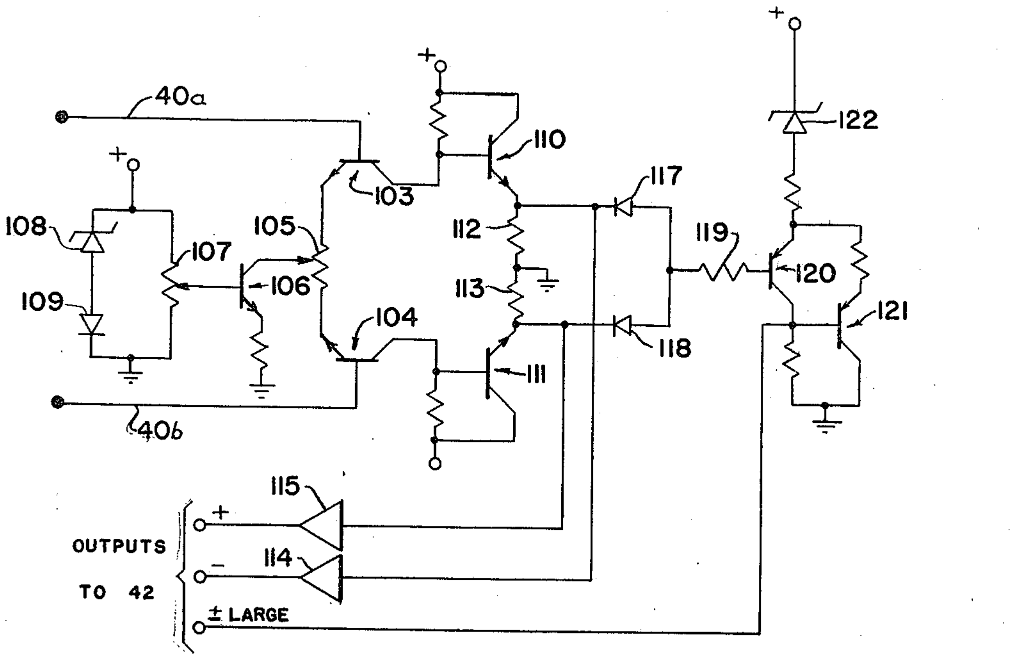
FIG. 6 is a schematic diagram showing a threshold detector circuit usable in the apparatus of FIG. 3.

FIG. 6 shows a threshold detector circuit usable as unit 41 in FIG. 3. In FIG. 6, input signals from balanced demodulator 40, representing the possible positive and negative polarities, are connected via conductors **40*a* and 40*b*, respectively to the base electrodes of conventional NPN transistors indicated generally at 103 and 104. The emitter electrodes of transistors 103 and 104 are connected to the opposite terminals of a resistance element of a potentiometer 105. The movable wiper of potentiometer 105 is connected to the collector electrode of an NPN transistor indicated generally at 106. The base electrode of transistor 106 is connected to a threshold level voltage source for establishing the level at which the circuit of FIG. 6 is to operate. The circuit includes a potentiometer 107 the movable wiper of which is connected to the base electrode of transistor 106, and the resistance element of which is connected in parallel circuit relationship with a series circuit includinge a Zener diode 108 and a conventional diode 109. Diodes 108 and 109 are connected anode-to-anode between a source of positive DC voltage and ground. Potentimeter 107 can be adjusted to select an operating level for transistor 106 which is used as a current source for transistors 103 and 104. Potentiometer 105, connected between the emitters of transistors 103 and 104**, can be adjusted to balance the operation of those transistors.

The collector electrodes of transistors 103 and 104 are connected to suitable load resistors and to the base electrodes of conventional NPN transistors indicated generally at 110 and 111. As will be recognized, transistors 103, 104, 110, and 111 are connected as a differential amplifier, a difference between the voltages provided to the base electrodes of transistors 103 and 104 being effective to produce, at one output of transistors 110 and 111, an output signal. The emitter electrodes of transistors 110 and 111 are connected through fixed resistors 112 and 113 to ground. The emitter electrode of transistor 110 is also connected to the input terminal of a regenerative amplifier 114 the output terminal of which constitutes one output of the threshold detector circuit. The emitter electrode of transistor 111 is similarly connected through a regenerative amplifier 115 and constitutes the second output of unit 41.

The outputs from amplifiers 114 and 115 are the small phase difference polarity signals previously discussed. To develop a signal responsive to large phase errors, the outputs of both sides of the differential amplifier are full-wave rectified through diodes 117 and 118 and coupled through a fixed resistor 119 to the input of a regenerative amplifier including PNP transistors indicated generally at 120 and 121. The emitter electrodes of transistors 120 and 121 are both connected to the anode of a Zener diode 122. If the signal provided to the input of the regenerative amplifier is greater than a "large error" threshold established by Zener diode 122, an output appears at the collector of transistor 120 and is coupled to the input of amplifier unit 42 as the large signal error, thereby providing the appropriate gate for the gated audio oscillator associated therewith. Amplifiers 114 and 115 are functionally similar to the amplifier including transistors 120 and 121.

Figure 7:
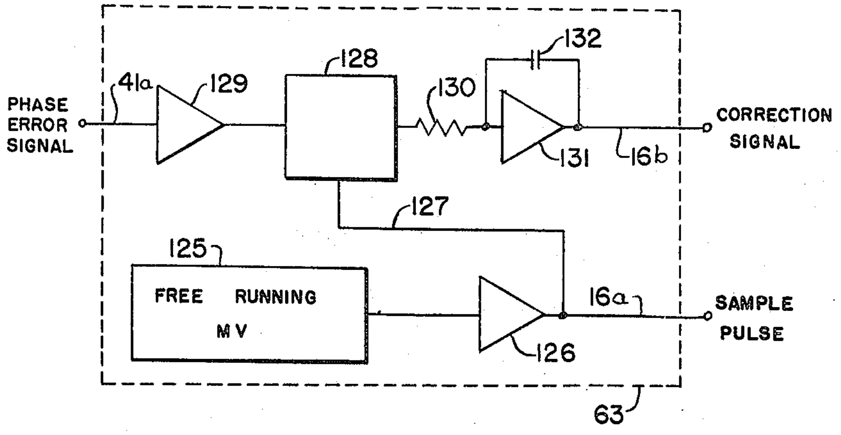
FIG. 7 is a schematic diagram showing an integrator-timer circuit usable in the apparatus of FIG. 3.

A detailed schematic diagram of integrator times 63 is provided in FIG. 7. A free running multivibrator circuit 125 operates at a relatively slow rate and changes state as infrequently as once every thirty seconds. When circuit 125 enters one state a pulse is applied to an amplifier 126, the output of which is applied as a balance sample pulse via conductor 16*a* to color burst gate 68 and, via conductor 127, to a gate circuit 128. As previously described, the balance sample pulse on conductor 16*a* prevents color burst gate 68 from passing the remote sync signals from unit 66 to burst filter (see FIG. 4). At the same time, the balance sample pulse gates the master 3.58 mHz. signal from the central program source through gate 68 to the burst filter and color guard units. The master 3.58 mHz. color burst is filtered by burst filter 69 which impersses any phase shift due to temperature variations of the crystals or other inherent phase shifting characteristics upon the master 3.58 mHz. signal applied through conductor 22*a* (FIG. 4) to demodulator 40. Demodulator 40 compares the impressed 3.58 mHz. master signal with the reference master signal and determines a phase error in its usual manner. This phase error is conducted through detector unit 41 and applied to the input of amplifier 129 of integrator-timer circuit 63, as seen in FIGS. 3 and 7, through conductor 41*a*. The output of amplifier 129 is connected to one input of gate 128 (FIG. 7) and when the balance sample pulse is present from the output of amplifier 126, gate 128 passes the phase error signal through resistor 130 to operational amplifier 131. The correction signal output of operational amplifier 131 is applied through conductor 166 to one input of burst filter 69, as seen in FIGS. 4 and 7, to a phase shifting circuit in filter 69 which makes the appropriate phase correction to compensate for internal phase shift characteristics. A capacitor 132 constitutes a feedback loop between the input and output terminals of operational amplifier 131 forming an integrating amplifier in which the capacitor charges to the level of the correction signal while the balance sample pulse is applied. When multivibrator 125 returns to its second state, the balance sample pulse disappears and gate 128 blocks farther error signals from detector unit 41 via conductor 41*a* and amplifier 129. Capacitor 132 is not discharged and holds the last correction signal voltage applied until another balance sample pulse is generated. It should be noted that this sequence of measuring the phase shift caused by the inherent characteristics of burst filter 69 all occurs while multivibrator 125 is in its first toggled state, a period which advantageously is short compared to the approximately thirty seconds it remains in its second state. This operation of the integrator-timer 63 will automatically balance the system for small phase shift drift caused by the inherent characteristics of the components of burst filter 69.

Figure 8:
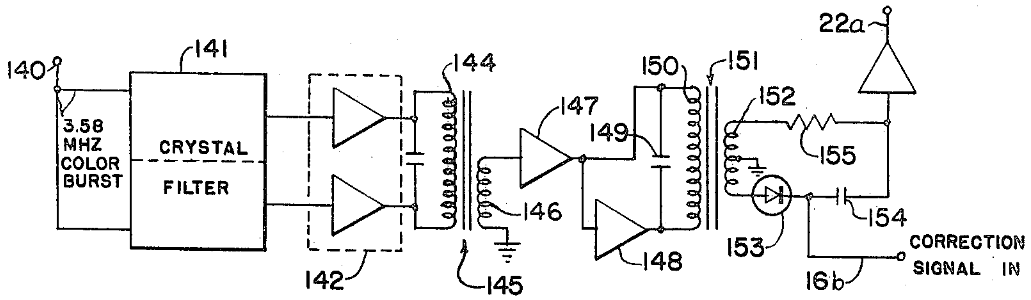
FIG. 8 is a schematic diagram of a burst filter circuit usable in the regenerator unit of FIG. 4.

The burst filter circuit 69 is shown in greater detail in FIG. 8. The 3.58 mHz. color burst from burst gate 68 is applied to input terminal 140 and connected to the two input terminals of a conventional push-pull moderate Q crystal filter 141. The two outputs of filter 141 are connected to the two input terminals of a push-pull amplifier 142 which drives a tuned load circuit including a capacitor 143 connected in parallel circuit relationship with a primary winding 144 of a coupling transformer indicated generally at 145. Transformer 145 has a secondary winding 146 one terminal of which is connected to ground and the other terminal of which is connected to the input terminal of an amplifier 147. The output of amplifier 147 is connected to the input of an amplifier 148 and to one terminal of a primary winding 150 of a coupling transformer indicated generally at 151. The output of amplifier 148 is connected to the other terminal of winding 149. A capacitor 149 is connetced in parallel circuit relationship with winding 150, the value of the capacitor and winding 150 being selected to form a tuned load for the amplifiers. Amplifiers 147 and 148 are biased and connected to operate as limiting amplifiers to provide signals of predetermined constant magnitude to transformer 151.

One end of a secondary winding 152 of transformer 151 is connected to the anode of a variable capacity diode 153, the cathode of which is connected to one terminal of a fixed capacitor 154. The other terminal of capacitor 154 is connected to one terminal of a fixed resistor 155 the other terminal of which is connected to the other end terminal of winding 152. The center tap of winding 152 is connected to AC ground. The junction between diode 153 and capacitor 154 is connected via conductor 16*b* to integrator-timer 63 (FIG. 7). The junction between capacitor 154 and resistor 155 is connected to the input terminal of a tuned limiting amplifier 156 which again amplifies and limits the signal and connects it, via conductor 22*a*, to phase comparator circuit 16 (FIG. 2).

The circuit including variable capacity diode 153, capacitor 154, resistor 155 and transformer 151 is a variable phase shift circuit the shift of which is controllable over roughly a 30° range. The amount of shift is controlled by the magnitude of the signal provided on conductor 16*b* which controls the voltage bias applied across diode 153. The capacitance of diode 153 is proportional to the bias so that the total phase shift is also proportional to the correction voltage. Thus, the voltage developed by the integrator including amplifier 131 and capacitor 132 (FIG. 7) controls the phase of the regenerated 3.58 mHz. on conductor 22*a* within the 30° design range.

Figure 9:
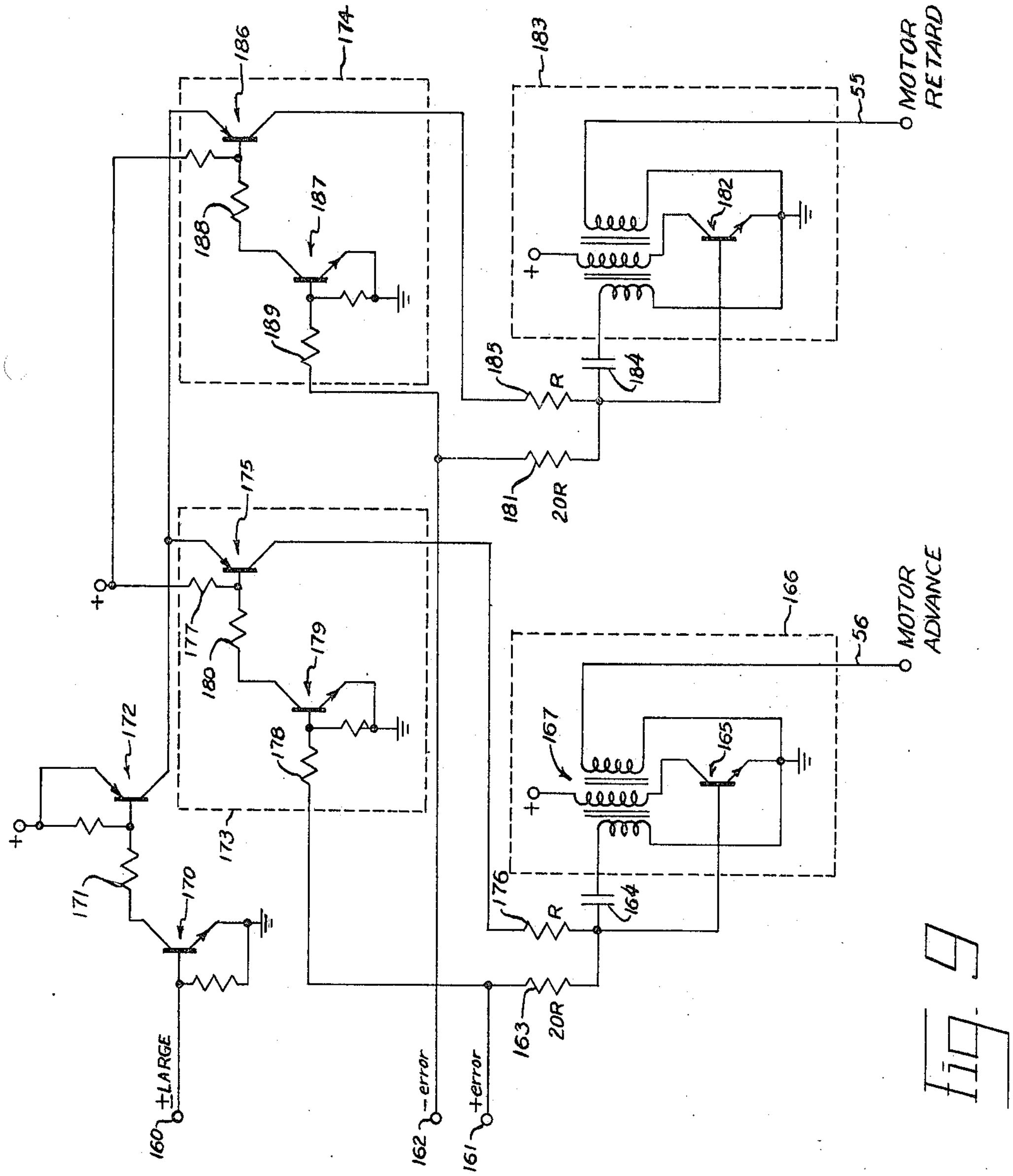
FIG. 9 is a schematic diagram of a motor logic circuit usable in the system of FIG. 3.

The motor drive logic circuitry 54 is shown in FIG. 9 in greater detail. As previously described, the three signals from filter detectors 30 are DC levels representing advance, retard of large error commands. The three signals are connected to input terminals 160, 161, and 162 in FIG. 9, input terminal 160 being that to which the large error command is applied and terminals 161 and 162 receiving the advance and retard signals, respectively.

Consider first the advance error signal circuit. The function of this circuit is to accept the DC error signal at terminal 161 and convert that signal into a series of pulses occurring at a relatively slow repetition rate during relatively small errors and a relatively high repetition rate during large errors. If no large error exists, the signal applied to terminal 161 is coupled through a fixed resistor 163 to one terminal of a fixed capacitor 164 and to the base electrode of a conventional NPN transistor indicated generally at 165. Transistor 165 is the active element in a conventional blocking oscillator circuit 166, the remaining elements of the blocking oscillator circuit including capacitor 164 and a feedback transformer indicated generally at 167. The DC error signal applied to terminal 161 is applied to capacitor 164 through resistor 163. When the charge on capacitor 164 reaches a critical level determined by the characteristics of transistor 165 and the low DC resistance of transformer 167, transistor 165 becomes conductive, producing a surge of current through transformer 167 which is coupled, through the output winding of the transformer, to conductor 56 which delivers the pulse thus produced to the appropriate terminal in amplifier unit 58. When transistor 165 conducts, capacitor 164 is discharged and is then ready to begin charging again if an error signal still exists at input terminal 161. The values of resistor 163 and capacitor 164 are advantageously selected so that one pulse is produced on conductor 56 every 0.5 second or so long as a continuous command is applied to terminal 161.

The existence of large error in the advance direction causes no change at the terminal 161. The large error signal is applied to terminal 160 and thence to the base electrode of a conventional NPN transistor indicated generally at 170. The signal causes transistor 170 to become conductive. The collector electrode of transistor 170 is connected through a fixed resistor 171 to the base electrode of a conventional PNP transistor indicated generally at 172. The emitter electrode of transistor 172 is connected to a positive DC voltage supply, and the collector electrode is connected to one input of a gating circuit 173 and one input of a similar gating circuit 174. The input to which the collector electrode of transistor 172 is connected is the emitter electrode of a conventional PNP transistor indicated generally at 175. The collector electrode of transistor 175 is connected through a fixed resistor 176 to capacitor 164 and the base electrode of transistor 165. It will be recognized that a second charging path for capacitor 164 is provided through resistor 176, the emitter-collector circuit of transistor 175, and the emitter-collector circuit of transistor 172, the latter emitter electrode being connected to the positive source. For this charging circuit to be complete, it is necessary that a large error signal be applied to terminal 160, thus rendering transistor 172 conductive; and that transistor 175 also be conductive. For transistor 175 to conduct, it is necessary that the emitter be positive, i.e,, that transistor 172 be conductive, and also that the base electrode be supplied with a negative signal. The base electrode of transistor 175 is normally held positive by the potential applied from a positive DC source through a fixed resistor 177 connected to the base. When an advance signal is applied to terminal 161, this signal is coupled through a fixed resistor 178 to the base electrode of a conventional NPN transistor indicated generally at 179, rendering that transistor conductive. The collector electrode of transistor 179 is connected through a fixed resistor 180 to the base electrode of transistor 175. When transistor 179 becomes conductive, its collector electrode drops to substantially ground potential, thus providing the necessary decreased potential at the base electrode of transistor 175 and, if the large error signal is also present, completing the charging path through resistor 176.

It should now be recognized that resistor 176 is selected to be substantially smaller than resistor 163 so that, for equal voltages applied to the two charging circuits, the current flowing through capacitor 164 is much greater when the large error signal is present than when the advance error signal is present alone. A ratio of roughly 20:1 between the values of the resistors is adequate. With the increased charging current provided when both the advance and the large error signals are present, blocking oscillator 166 is capable of providing one pulse approximately each 25 milliseconds on conductor 56, the pulses being of substantially the same amplitude as in the low repetition rate operation.

As to the retard error signals, it will be recognized that DC signals applied at terminal 162 are coupled through a fixed resistor 181 to the base electrode of a conventional NPN transistor 182 in a blocking oscillator circuit 183 which is substantially identical to oscillator 166. Resistor 181 forms one charging circuit for a fixed capacitor 184 in the blocking oscillator. An alternative charging circuit is provided by a fixed resistor 185 and gate circuit 174 which includes a conventional PNP transistor 186, the emitter-electrode of which is connected to the collector electrode of transistor 172, and a conventional NPN transistor indicated generally at 187, the collector electrode of which is coupled through a fixed resistor 188 to the base electrode of transistor 186, and the base electrode of which is coupled through a fixed resistor 189 to input terminal 162. The operation of circuit 174 to provide a fast charging circuit for blocking oscillator 183 is identical to the operation described with reference to the motor advance circuit under large error conditions. The repetition rates provided on conductor 55 are also identical and need not be further described.

Figure 10:
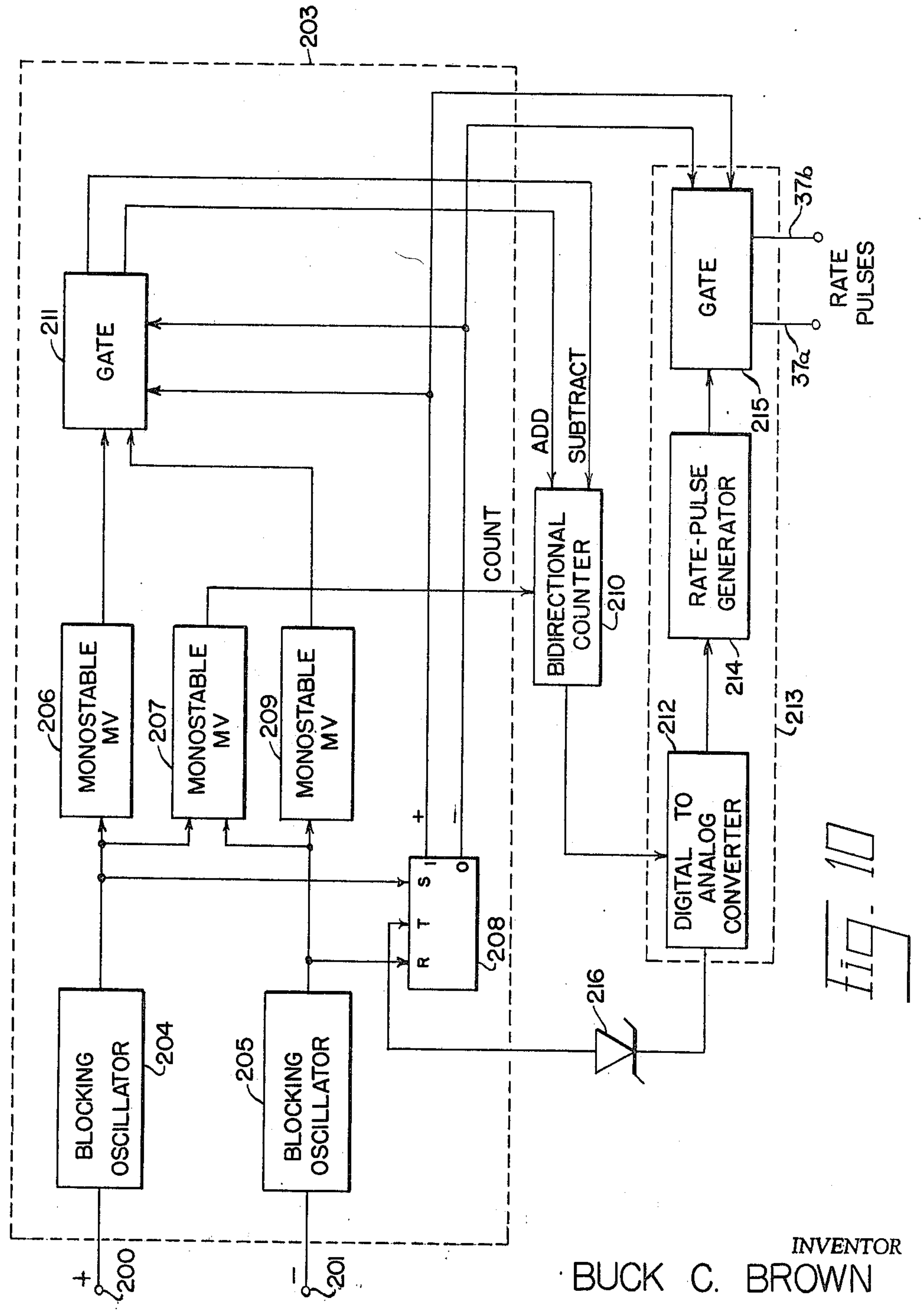
FIG. 10 is a schematic diagram of a rate compensator unit usable in the system of FIG. 2.

Rate compensator unit 36 is shown in greater detail in FIG. 10. The purpose of the rate compensator unit is to provide a series of pulses on one or the other of conductors 37*a* and 37*b* to the phase divider circuit in order that the rate at which signals are supplied to the motor can be more closely correlated with the magnitude of the small rate of change of phase error between the color bursts from the two sources. The small rate error is due to the small frequency difference which commonly exists between the two standard oscillators 12 and 33. This is not to be confused with the large step or slew rate difference discussed with reference to FIG. 9. The apparatus in FIG. 10 counts and averages the total number of advance and retard commands transmitted via the telephone line. For any non-zero average of advance and retard signals, the apparatus of FIG. 10 generates pulses which tend to drive the motor 59 at a rate representative, as stated, of the frequency difference between the two 3.58 mHz. sources. It will be recognized that the only pulses that need be transmitted, after the rate correction has been stabilized and initial phase errors have been compensated, are those due to short-term variations of phase in the video transmission path.

The positive and negative advance and retard signals developed by detectors 51 and 52 (FIG. 3) are connected to input terminals 200 and 201 of a rate pulse control circuit 203. The positive and negative signals are connected, respectively, to the input terminals of blocking oscillators 204 and 205. The input commands are integrated by the blocking oscillator circuits, the circuits being designed so that it is necessary for either one input command or a series of input commands to exist at terminals 200 and 201 for approximately one second before an output pulse is generated. The integration serves two purposes, one being a reduction of the effective bandwidth of the system, thus enhancing the ability of the system to reject noise and transient signals. The other advantage gained is that the response time of the rate unit is made sufficiently greater than the response time of the phase servo so that the possibility of oscillatory conditions in the servo is eliminated.

The output of blocking oscillator circuit 204 is connected to the input of a monostable multivibrator 206, to one input of a monostable multivibrator 207, and to the set input of a bistable circuit 208. The output of blocking oscillator 205 is connected to the other input of monostable multivibrator 207 and also to the input of a monostable multivibrator 209 and to the reset input of bistable circuit 208. The output of multivibrator 207 is connected to the count input of a bidirectional counter circuit 210. It will be apparent that multivibrator 207 responds to each pulse produced by either one of the blocking oscillators to produce a count input, and that a count is registered, in either the add or subtract direction, for each such input.

The direction of the count is controlled by bistable circuit 208 and a gate circuit 211 which receives inputs from both of multivibrators 206 and 209, the conductive state of the gates in gate circuit 211 being controlled by signals from the output terminals of bistable circuit 208. Each output from multivibrators 206 or 209 is gated through gate 211 to either the add or subtract control terminal of bidirections counter 210.

From the above it will be seen that the pulses produced by the blocking oscillators cause monostable multivibrator 207 to produce a pulse which provides a count to counter 210, either increasing or decreasing the total count contained therein, the direction being determined by the selection of one of the add and subtract lines from gate 211. Multivibrators 206 and 209 provide the direction identification through gate 211 which is controlled in turn by a signal on one of the output lines from bistable circuit 208, circuit 208 being initially set or reset depending upon which of the blocking oscillator circuits produces the first pulse causing generation of a count. Thereafter, circuit 208 is held in that state by the clamping action of a Zener diode 216 which is connected between the output of counter 210 and the toggle connection of circuit 208 until a zero count is reached again by counter 210. If bistable circuit 208 is initially reset by a retard signal, the signal is registered by counter 210 as an "add retard" pulse. If the next signal is an advance signal, it is registered as a "subtract retard" signal, returning the count to zero.

The output of bidirectional counter circuit 210 is connected to the input of a digital-to-analog converter circuit 212 in rate pulse generator unit 213. Converter circuit 212 provides an analog signal which is proportional to the instantaneous total count in counter 210, the output of unit 212 being connected to the input of a rate pulse generator 214. The pulse rate generator produces a series of output pulses at a repetition rate proportional to the magnitude of the analog signal from converter circuit 212. The output of generator 214 is gated through a gate circuit 215 to connect the train of pulses produced by generator 214 to either an advance rate pulse line 37*a* or a retard rate pulse line 37*b*, these signals being connected to phase divider circuit 57. The control of gate circuit 215 is accomplished by the outputs from bistable circuit 208.

Figure 11:
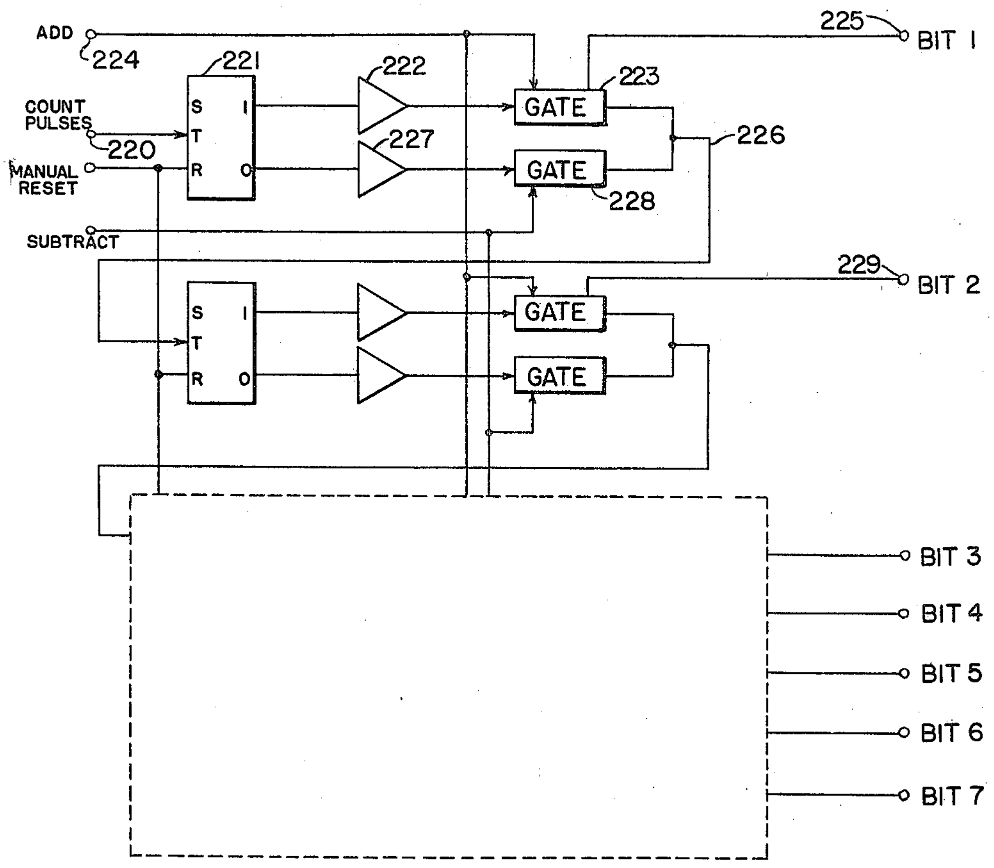
FIG. 11 is a schematic diagram of a rate storage circuit usable in the rate compensator unit of FIG. 10.

The arrangement of bidirectional counter 210 is shown in greater detail in FIG. 11, the particular bidirectional counter shown being a seven-bit counter. This apparatus includes identical bidirectional binary counters, only one of which will be described. The count signals are received by the counter on an input terminal 220 from which they are connected to the toggle input terminal of a bistable circuit 221. Assuming that the counter is initially in its zero state, application of a pulse to the toggle input terminal causes bistable circuit 221 to provide an output at its one terminal, this terminal being connected to a buffer amplifier 222 to the input of a gate circuit 223. Simultaneously, an add signal is provided from gate circuit 211 to input terminal 224 and to the control input terminal of gate circuit 223, as well as all other counterpart gate circuits in the remaining stages of the counter. An output therefore appears from the gate circuit, this output being connected to a bit one output terminal 225. An inverse output appears on a conductor 226, this output having no effect on this first add pulse. Assuming that the next pulse is from the same blocking oscillator which produced the first pulse, a signal is again provided to terminal 220 and the toggle input of bistable circuit 221, simultaneously with an add input singal of terminal 224. An output is now produced at the zero output of bistable circuit 221 and is coupled through a buffer amplifier 227 to a gate circuit 228 which is blocked because of the absence of a subtract signal. The output at the one output terminal of bistable circuit 221 is, however, gated through gate 223 because of the presence of an add input, this gated signal being in the inverse direction on conductor 226, providing a toggle input signal to the second stage. The second stage, being also provided with the add input signal, produces a one output on the bit two output terminal 229, the level at terminal 225 returning to zero, resulting in a zero one count.

If the next pulse is produced by the other blocking oscillator from that which produced the first two pulses, a subtract input signal is provided so that the inverse pulse returns the bit two output to the zero level and the bit one output to the one level, decreasing the count to one. It is believed that this discussion is adequate to allow one skilled in the art to fully understand the operation of this form of bidirectional counter, the remaining stages being identical to those shown. The bit one-bit seven output terminals are connected to the inputs of digital-to-analog converter circuit 212.

Figure 12:
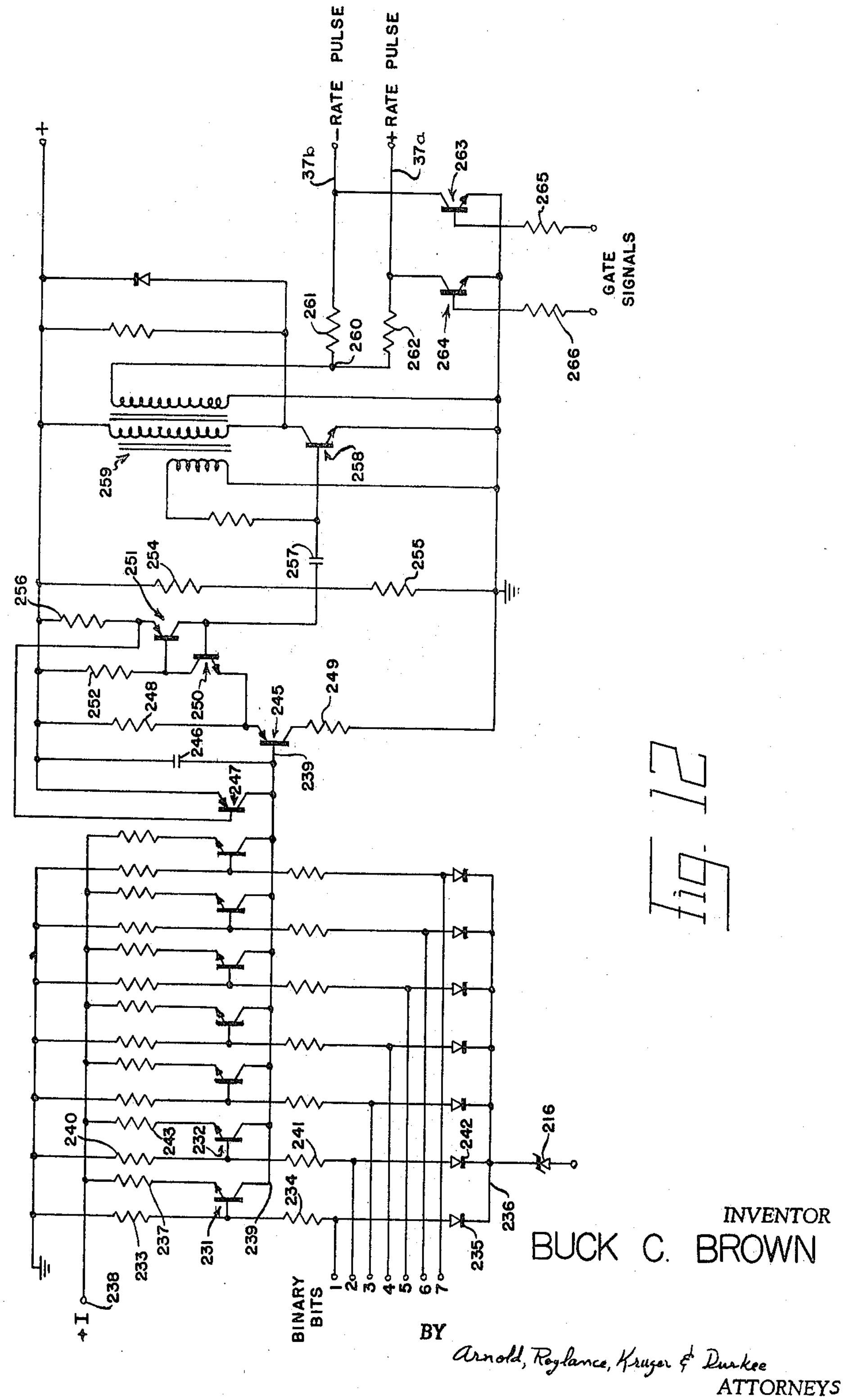
FIG. 12 is a schematic diagram of a rate pulse generator circuit usable in the rate compensator unit of FIG. 10.

The digital-to-analog convertor 212 and the rate pulse generator circuit 214 with gate circuit 215, these elements constituting the rate pulse generator 213, are shown in detail in FIG. 12. Binary bits 1–7 are connected to the seven input terminals of the digital-to-analog converter which includes seven substantially identical transistor current sources. Only two stages of the D to A converter are numerically designated, these including conventional NPN transistors indicated generally at 231 and 232. The base electrode of transistor 231 is connected to one terminal of a fixed resistor 233, the other terminal of which is connected to a circuit ground, the base electrode also being connected to one terminal of a fixed resistor 234, the other terminal of which is connected to binary bit one input terminal and to the anode of a semiconductor diode 235. The cathode of diode 235 is connected via a conductor 236 to the cathode of Zener diode 216, the anode of which is connected to the toggle input of bistable circuit 208. The emitter electrode of transistor 231 is connected through a fixed resistor 237 to a small magnitude positive source of voltage connected to terminal 238. The collector electrode of transistor 231 is connected to a conductor 239 to which the collector electrodes of all transistors in the following six stages of the D to A converter are also connected.

In a similar manner, the base electrode of transistor 232 is connected through a fixed resistor 240 to ground, and through a fixed resistor 241 to a binary bit two input terminal and to the anode of a semiconductor diode 242, the cathode of which is connected to conductor 236. The emitter electrode of transistor 232 is connected through a fixed resistor 243 to the voltage source terminal 238. Again, the collector electrode of transistor 232 is connected to conductor 239.

Each of the binary inputs, one through seven, respectively drive transistor current sources including transistors 231, 232 and the following five identical circuits. If a binary input exists at one or more of the binary bit input terminals, the base electrodes of the associated current source transistors are elevated to approximately eight volts. Large value degenerative emitter resistors 237, 243 and the counterpart resistors in the remaining circuits, then determine the collector current flowing in the activated transistors. The values of the emitter resistors 237, 243, etc., are selected in binary step values so that if resistor 237 has a value $R\times2^0$, resistor 243 has a value $R\times2^1$, the next emitter resistor has a value $R\times2^2$, the next $R\times2^3$, etc. Thus, the magnitude of the collector currents also form a binary series. A total current proportional to the binary inputs is obtained by connecting all collector electrodes in parallel to conductor 239.

The current thus derived on conductor 239 is applied to the rate pulse generator 214.

In rate generator 214, conductor 239 is connected to the base electrode of a conventional PNP transistor indicated generally at 245, and to one terminal of a capacitor 246, the other terminal of which is connected to the positive DC voltage source. Conductor 239 is also connected to the collector electrode of a conventional PNP switching transistor indicated generally at 247, the emitter electrode of which is connected to the positive supply. Transistor 245 is connected as an emitter follower, the emitter electrode being connected through a fixed resistor 248 to the positive supply and the collector electrode being connected through a fixed resistor 249 to ground. The emitter electrode of transistor 245 is also connected to the emitter electrode of a conventional NPN transistor indicated generally at 250. The collector electrode of transistor 250 is connected to the base electrode of a conventional PNP transistor indicated generally at 251, and, via, a fixed resistor 252, to the positive supply. The collector electrode of transistor 251 is connected to the base electrode of transistor 250 and to a junction 253 at an intermediate point in a voltage divider circuit formed by resistors 254 and 255 connected between the positive supply and ground. The emitter electrode of transistor 251 is connected to the base electrode of transistor 247 and, through a fixed resistor 256, to the positive supply.

The circuit elements between conductor 239 and junction 253, including the four transistors discussed above, constitute a pulse generating circuit which responds to the current from conductor 239 to produce a repetitive train of pulses, the repetition rate of the pulse being proportional to the magnitude of the current developed by the digital-to-analog converter. The current in conductor 239 charges capacitor 246, the charge on the capacitor being buffered by emitter follower 245. When the voltage associated with the accumulated charge on capacitor 246 exceeds a threshold value established at junction 253 by the voltage divider, the normally nonconducting pair of transistors 250 and 251 become conductive and regeneratively charge to a saturated state. The emitter current of transistor 251 is applied to the base of switching transistor 247 which is rendered conductive and which quickly discharges capacitor 246. When capacitor 246 has completely discharged, transistors 250 and 251 revert to a nonconductive state, transistor 247 also is turned off and capacitor 246 again begins to charge toward the threshold level for so long as current is present on conductor 239. It will be recognized that this circuit produces repetitive pulses more frequently when the current on conductor 239 is greater.

The pulses appear at junction 253 and are coupled through a coupling capacitor 257 to drive a blocking oscillator which includes a conventional NPN transistor indicated generally at 258 and an inductive device 259. Device 259 is a conventional feedback and coupling transformer which cooperates with transistor 258 in a conventional manner customary in blocking oscillators. The output from the blocking oscillator, which is one pulse for each pulse produced at junction 253, appears at junction 260 and is coupled through one of fixed resistors 261 and 262 to the rate pulse conductors 37*a* or 37*b*.

It will be apparent that the output of the blocking oscillator is to be provided on only one of the rate pulse output conductors, the selection of the appropriate one being accomplished by a gate circuit including a conventional NPN transistor indicated generally at 263 and a similar transistor indicated generally at 264. The emitter-collector circuit of transistor 263 is connected between conductor 37*b* and ground and the emitter-collector circuit of transistor 264 is connected between conductor 37*a* and ground. The base electrode of transistor 263 is connected through a fixed resistor 265 to the one output terminal of bistable circuit 208, the base electrode of transistor 264 being connected through a fixed resistor to the zero output terminal of bistable circuit 208. It will be apparent that an output signal will exist on conductor 37*a* for so long as transistor 264 is nonconductive, and that to render transistor 264 nonconductive a zero level must exist at the zero output terminal of bistable circuit 208. Conversely, when the one output signal is present at the output of bistable circuit 208, transistor 263 is conductive and that the signal on conductor 37*b* is shunted to ground. Thus, bistable circuit 208 controls gate circuit 215 to select the conductor on which the rate pulse generator output pulse train appears.

Figure 13:
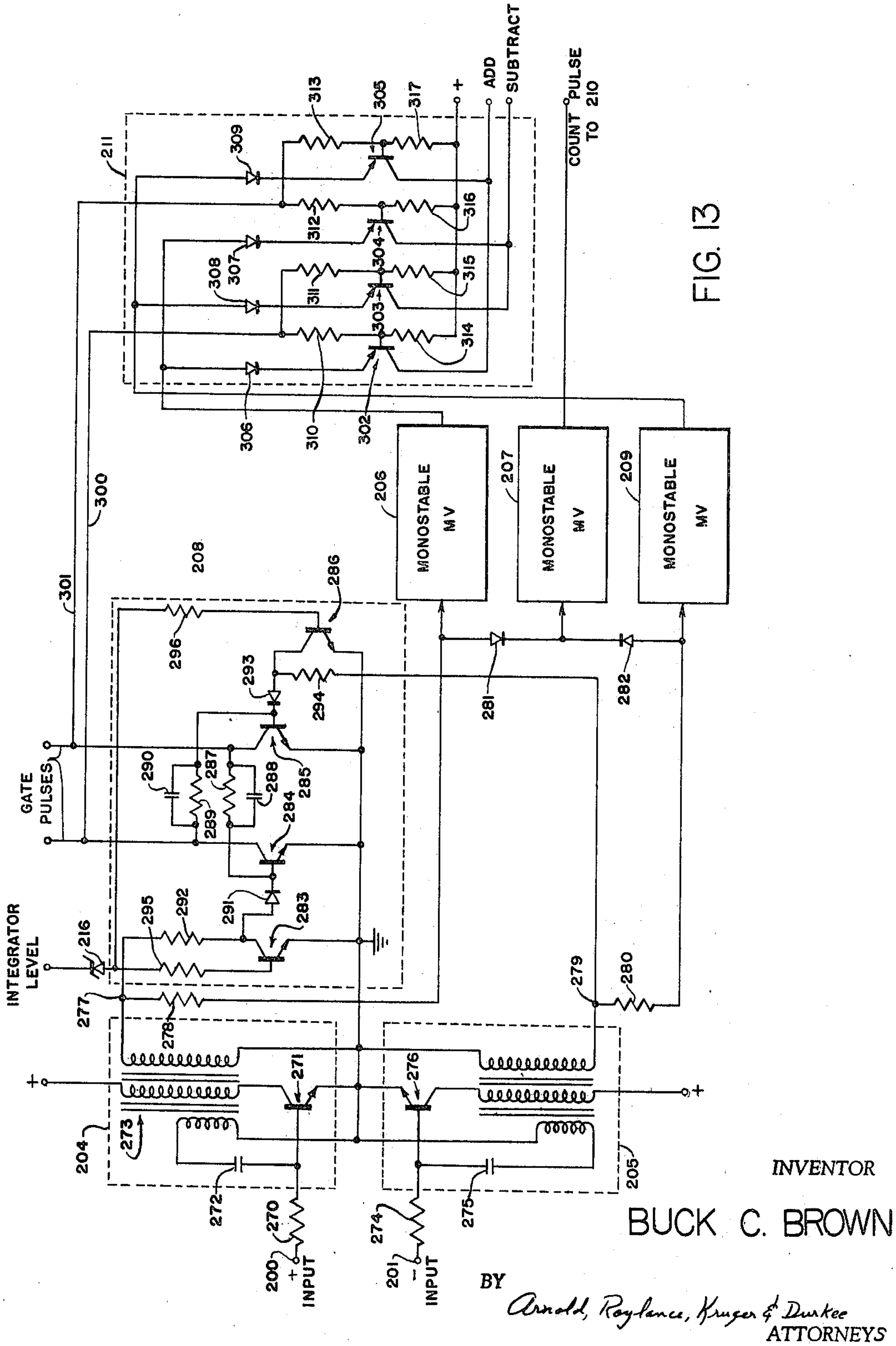
FIG. 13 is a schematic diagram of a rate pulse control circuit usable in the rate compensator unit of FIG. 10.

The rate pulse control circuit, discussed with reference to FIG. 10, is shown in greater detail in FIG. 13. The advance and retard command pulses are applied to input terminals 200 and 201 and are coupled into integrating and blocking oscillators 204 and 205, respectively. In each of the blocking oscillators, an input circuit performs the integrating function, this circuit including series fixed resistor 270 which is connected between input terminal 200 and the base electrode of a conventional NPN transistor indicated generally at 271. A capacitor 272 is connected between the base electrode of transistor 271 and the input winding of a feedback and coupling transformer 273 which is connected with transistor 271 to form the blocking oscillator. Resistor 270 and capacitor 272 will be recognized as a conventional integrating circuit. The blocking oscillator is otherwise substantially identical to those discussed with reference to FIG. 9 and need not be described in greater detail. The input circuit in blocking oscillator 205 includes a series input resistor 274 and a shunt capacitor 275. The integrated signal in blocking oscillator 205 is applied to the base electrode of a conventional NPN transistor indicated generally at 276.

The output of blocking oscillator 204 appears at a junction 277 and is connected directly to bistable circuit 208 and, through a fixed resistor 278, to one input of monostable multivibrator 206. The output of blocking oscillator 205 appears at a junction 279 and is coupled to bistable circuit 208, and, through a fixed resistor 280 to the input of monostable multivibrator 209. The outputs of blocking oscillators 204 and 205 are connected to the anodes of two conventional semiconductor diodes 281 and 282, respectively, the cathode electrodes of which are connected to each other and to the input of monostable multivibrator 207. As previously described, multivibrator 207 responds to each output pulse produced by either blocking oscillator to provide a count pulse to bidirectional counter 210.

Bistable circuit 208 includes four NPN transistors indicated generally at 283, 284, 285 and 286. The emitter-electrodes of transistors 284 and 285 are connected to ground. The base electrode of transistor 284 is connected through a coupling circuit including a fixed resistor 287 and a capacitor 288 to the collector-electrode of transistor 285. The base electrode of transistor 285 is similarly connected through a coupling circuit including a fixed resistor 289 and a capacitor 290 to the collector-electrode of transistor 284. This interconnection forms a conventional bistable circuit. The base electrode of transistor 284 is connected through a conventional semiconductor diode 291 to the collector-electrode of transistor 283 and, through a fixed resistor 292, to junction 277 at the output of blocking oscillator 204. The emitter-electrodes of transistors 283 and 286 are connected to ground. The base electrode of transistor 285 is connected through a conventional semiconductor diode 293 to the collector-electrode of transistor 286 and, through a fixed resistor 294, to junction 279 at the output of blocking oscillator 205. The base electrodes of transistors 283 and 286 are connected through fixed resistors 295 and 296, respectively, to the anode of Zener diode 216, the cathode of which is connected to the digital-to-analog converter 212, as previously described.

Transistors 284 and 285, forming the cross-coupled bistable circuit, receive trigger signals through resistors 292 and 294 and diodes 291 and 293, the output from either blocking oscillator causing the bistable circuit to change state, or locking it in a state previously assumed, so long as transistors 283 and 286 are nonconductive. These transistors remain nonconductive for so long as no input signal is supplied through Zener diode 216, a condition which exists only when there is no output from the digital-to-analog converter at conductor 236, as described with reference to FIG. 12. If a count exists at the output of bidirectional counter 210, however, a sufficient potential appears at conductor 236 to cause the Zener diode to become conductive and to render transistors 283 and 286 simultaneously conductive, thereby preventing any signals from blocking oscillators 204 or 205 from having any effect on the state of the bistable circuit.

The output signals from the bistable circuit are taken from the collector-electrodes of transistors 284 and 285 and are connected through resistors 265 and 266 to gate circuit 215, shown in FIG. 12. The output signals are also connected through conductors 300 and 301 to gate circuit 211 which controls the directional effect of pulses produced by monostable multivibrators 206 and 209.

Gate circuit 211 includes four transistors indicated generally at 302, 303, 304, and 305. The emitter-electrodes of transistors 302 and 304 are connected through conventional semiconductor diodes 306 and 307, respectively, to the output of multivibrator 206. The emitter-electrodes of transistors 303 and 305 are connected through conventional semiconductor diodes 308 and 309 to the output of multivibrator 209. From this connection it will be seen that transistors 302 and 304 can each respond to the output of multivibrator 206, depending upon the base potential at the time a pulse appears at the respective emitter electrodes. Similarly, transistors 303 and 305 can respond to the output of multivibrator 209, again depending upon the base potential. One output from bistable circuit 208 is connected via conductor 300 through fixed resistors 310 and 311 to the base electrode of transistors 302 and 303, respectively. Similarly, the output of bistable circuit 208 appearing on conductor 301 is connected through resistors 312 and 313 to the base electrode of transistors 304 and 305, respectively. Fixed resistors 314, 315, 316 and 317 are each connected to a positive DC voltage source and to one of the base electrodes of transistors 302–305, respectively, completing four divider circuits for the biasing of the various base electrodes in response to the bistable circuit outputs. It will be noted that one output from bistable circuit 208 is connected to one transistor of the pair responsive to the output of multivibrator 206 and to one of the pair responsive to multivibrator 209. Similarly, the other output is connected to the other two transistors, one each response to each of the two multivibrators. The collector-electrodes of transistors 303 and 303 and 304 are connected together and to the subtract output of gate 211. The collector electrodes of transistors 302 and 305 are connected to the add output of gate 211. In operation, if a pulse appears at the output of multivibrator 206, this can be viewed as an enabling pulse for transistors 302 and 304. If the state of bistable circuit 208 is such that this pulse is to be added, a negative potential, relative to the emitter potential, will be provided at the base electrodes of transistors 302 and 303, transistor 302 being the only one of these two which is provided with both of the necessary signals to render it conductive. An output therefore appears on the add output of gate 211. If this pulse is to be subtracted, the state of bistable circuit 208 would be such that the negative potential would be provided on conductor 301, placing transistor 305 in conduction and providing an output at the subtract output terminal of gate 211. The add and subtract output are provided to the appropriate terminals of bidirectional counter 210, as described with reference to FIG. 11.

The operation of the rate compensating apparatus is to provide a means for compensating the difference in frequency between the two standard oscillators, 12 and 33, thus increasing the frequency-difference tolerance of the system and also minimizing the total number of necessary control signals which need be transmitted from unit 10 to unit 11.

While an advantageous embodiment has been chosen to illustrate the invention, it will be understood by those skilled in the art that various changes and modifications can be made therein without departing from the scope of the invention.

What is claimed is:

1. Phase synchronization apparatus for use with a color television system of the type including a central program source from which complete programs can be transmitted to a plurality of receivers, and at least two remote television sources, geographically separated from said central source, from which video program signals are transmitted by a restricted access medium to the central source for processing and rebroadcast alone or in combination with material from another source, and wherein each program source is provided with a standard oscillator for providing to its associated source a color synchronizing signal, the apparatus comprising the combination of receiving means at said central source for receiving the remotely produced program signals including color subcarrier AC signals at a preselected frequency;

separator means connected to said receiving means for separating said color subcarrier signals from other information contained in said remotely produced video pragram signals, and for producing an output signal coherent in phase and frequency with said subcarrier;

phase comparator means connected to the standard oscillator at said central source and to said separator means for comparing the phase relationship of the color subcarrier signals from said central source and said remote source and for generating at least one phase error signal representative of magnitude and direction of phase difference between said signals;

means for accepting said output signal from said separator means and for generating a phase correction signal proportional to phase shift within said separator means;

circuit means for coupling said phase correction signal to said separator means to correct for said phase shift;

a narrow bandwidth transmission line for interconnecting said central source location and said remote source location;

circuit means connecting said phase comparator means with one end of said transmission line for providing said phase error signal to said line;

variable phase shifting means connected between the standard oscillator at the remote source and the remote program source transmission apparatus; and receiving means connecting said variable phase shifting means with the other end of said transmission line for receiving said phase error signal and for varying the phase of said phase shifting means to synchronize the phase of the remote source standard color subcarrier signal with that of the central source.

2. An apparatus according to claim 1 wherein said phase error signal includes a plurality of discrete pulses, and wherein said receiving means comprises means for accumulating said discrete pulses to produce a total count representative of the algebraic sum of said pulses, and converter means for producing a pulse train the repetition rate of which is proportional to said algebraic sum.

3. Apparatus according to claim 2 and further comprising gate circuit means connected to the output of said phase comparator circuit means for gating said at least one phase error signal to said circuit means connecting said phase error signal to said transmission line; and means responsive to said video signals from said master and remote locations to provide a disabling signal to said gate circuit means when either of said master and remote signals is not present at said master location and to prevent transmission of said phase error signals.

4. Apparatus according to claim 1 wherein said phase error signal includes a plurality of discrete pulses;

said phase comparator means comprises demodulator circuit means for producing first or second error signals, said first error signal being representative of a phase error in a first direction, and said second error signal being representative of a phase error in a second direction; and said receiving means comprises means for accumulating said discrete pulses to produce a total count representative of the algebraic sum of said pulses, means for converting said total count to an analog signal, and variable repetition rate oscillator means for producing a pulse train the repetition rate of which is proportional to said algebraic sum.

References Cited

UNITED STATES PATENTS

| | | | |
|---|---|---|---|
| 2,753,396 | 7/1956 | Gore. | |
| 3,392,231 | 7/1968 | Schonfelder. | |
| 3,431,351 | 3/1969 | Sennhenn | 178—5.2 |

JOHN W. CALDWELL, Primary Examiner

RICHARD MURRAY, Assistant Examiner

U.S. Cl. X.R.

178—5.2

PO-1050
(5/69)

UNITED STATES PATENT OFFICE
CERTIFICATE OF CORRECTION

Patent No. 3,493,680 Dated February 3, 1970

Inventor(s) Buck C. Brown

It is certified that error appears in the above-identified patent and that said Letters Patent are hereby corrected as shown below:

Col. 2, line 18, "quantity" should read -- quality --; line 43, "loaction" should read -- location --. Col. 3, line 1 "acompanying" should read -- accompanying --. Col. 4, line 31, "mhz" should read -- mHz --; line 43, "14" should read -- 24 -- Col. 6, line 64, "simnificantly" should read -- significantly - Col. 8, line 59, "intermedate" should read -- intermediate --. Col. 9, line 63, "impersses" should read -- impresses --. Col. 13, line 73, after "includes" should be inserted -- seven Col. 14, line 18, "singal" should read -- signal --.

SIGNED AND
SEALED
JUL 21 1970

(SEAL)
Attest:

Edward M. Fletcher, Jr.
Attesting Officer

WILLIAM E. SCHUYLER, JR.
Commissioner of Patents